(12) United States Patent
Hammagren et al.

(10) Patent No.: US 11,542,913 B1
(45) Date of Patent: Jan. 3, 2023

(54) WAVE ENERGY CONVERTER

(71) Applicant: Columbia Power Technologies, Inc., Charlottesville, VA (US)

(72) Inventors: Erik J. Hammagren, Charlottesville, VA (US); Pukha Lenee-Bluhm, Charlottesville, VA (US); Kelen P. Bush-O'Hearn, Charlottesville, VA (US); Michael L. Ondusko, Charlottesville, VA (US); Joseph H. Prudell, Charlottesville, VA (US); Leonard G. Rummel, Charlottesville, VA (US); Zhe Zhang, Charlottesville, VA (US)

(73) Assignee: Columbia Power Technologies, Inc., Charlottesville, VA (US)

( * ) Notice: Subject to any disclaimer, the term of this patent is extended or adjusted under 35 U.S.C. 154(b) by 0 days.

(21) Appl. No.: 17/528,705

(22) Filed: Nov. 17, 2021

(51) Int. Cl.
*F03B 13/20* (2006.01)

(52) U.S. Cl.
CPC .......... *F03B 13/20* (2013.01); *F05B 2270/18* (2013.01)

(58) Field of Classification Search
CPC .............................. F03B 13/20; F05B 2270/18
See application file for complete search history.

(56) References Cited

U.S. PATENT DOCUMENTS

| | | | |
|---|---|---|---|
| 8,314,506 B2 | 11/2012 | Rhinefrank et al. | |
| 8,508,063 B2 | 8/2013 | Rhinefrank et al. | |
| 8,659,179 B2 | 2/2014 | Rhinefrank et al. | |
| 9,587,620 B2 | 3/2017 | Rhinefrank et al. | |
| 2006/0208494 A1* | 9/2006 | Cook | F03B 13/20 290/53 |
| 2015/0252777 A1* | 9/2015 | Rhinefrank | F03B 13/20 290/53 |
| 2019/0331085 A1* | 10/2019 | Mundon | F03B 13/1895 |

FOREIGN PATENT DOCUMENTS

WO 2015088923 A2 6/2015

* cited by examiner

*Primary Examiner* — Viet P Nguyen
(74) *Attorney, Agent, or Firm* — Pierce Atwood LLP; Kevin M. Farrell; Shannon Vittengl

(57) ABSTRACT

A wave energy converter is provided which includes a central body including a nacelle, the nacelle housing at least one power take off. The wave energy converter also includes a first float and a first float arm coupled to the nacelle on a first side, and a second float and a second float arm coupled to the nacelle on a second side. The first float is rotatably coupled to the nacelle, the first float and the first float arm forming a first body configured to rotate, where the first body is operatively coupled to the at least one power take off such that relative motion between the first body and the central body generates energy in the at least one power take off. In one embodiment, the central body has a low reserve buoyancy, where the reserve buoyancy of the central body is lower than the reserve buoyancy of either of the first float and the second float, to minimize a heave response of the central body relative to the first float to increase output of the wave energy converter. In one embodiment, the central body includes a yoke extending downwardly from the nacelle, a plurality of lines attached to the base of the yoke, and a heave plate attached to the lower terminus of each of the plurality of lines.

26 Claims, 11 Drawing Sheets

WAVE ENERGY CONVERTER

FIELD OF THE INVENTION

The present disclosure relates generally to converting wave surge and heave forces into energy and more particularly to wave energy conversion devices and systems.

BACKGROUND

Ocean energy, and wave energy in particular, represents a consistent, reliable and predictable energy resource that is widely-available. Environmentally, waves also represent one of the most benign sources of clean renewable energy. This set of characteristics is unique to wave energy amongst the most widely-available, global renewable energy resources.

Wave energy is a globally-desirable resource and has the potential to be a cost-competitive and important component of a diverse mix of clean, renewable energy resources. A need exists for a wave energy conversion apparatus that efficiently and cost-effectively converts ocean wave energy into usable power while achieving reliability and survivability.

SUMMARY OF THE INVENTION

According to one aspect of the disclosure, a wave energy converter is provided which includes a central body including a nacelle, the nacelle having a first side, a second side, and a longitudinal axis, and the nacelle housing at least one power take off. The wave energy converter also includes a first float and a first float arm coupled to the nacelle on the first side, and a second float and a second float arm coupled to the nacelle on the second side. The first float is rotatably coupled to the nacelle, the first float and the first float arm forming a first body configured to rotate about the longitudinal axis, where the first body is operatively coupled to the at least one power take off such that relative motion between the first body and the central body generates energy in the at least one power take off. The central body has a low reserve buoyancy, where the reserve buoyancy of the central body is lower than the reserve buoyancy of either of the first float and the second float, to minimize a heave response of the central body relative to the first float to increase output of the wave energy converter.

According to another aspect of the disclosure, a wave energy converter is provided which includes a central body including a nacelle, the nacelle having a first side, a second side, and a longitudinal axis, the nacelle housing at least one power take off. The wave energy converter also includes a first float and a first float arm coupled to the nacelle on the first side, and a second float and a second float arm coupled to the nacelle on the second side. The first float is rotatably coupled to the nacelle, the first float and the first float arm forming a first body configured to rotate about the longitudinal axis, where the first body is operatively coupled to the at least one power take off such that relative motion between the first body and the central body generates energy in the at least one power take off. The central body further includes a yoke extending downwardly from the nacelle, a plurality of lines attached to the base of the yoke and extending downwardly, each of the plurality of lines have a lower terminus, and a heave plate attached to the lower terminus of each of the plurality of lines, where the heave plate and lines attached to the lower portion of the yoke tend to reduce rotation of the nacelle.

DETAILED DESCRIPTION

Figure 1A:
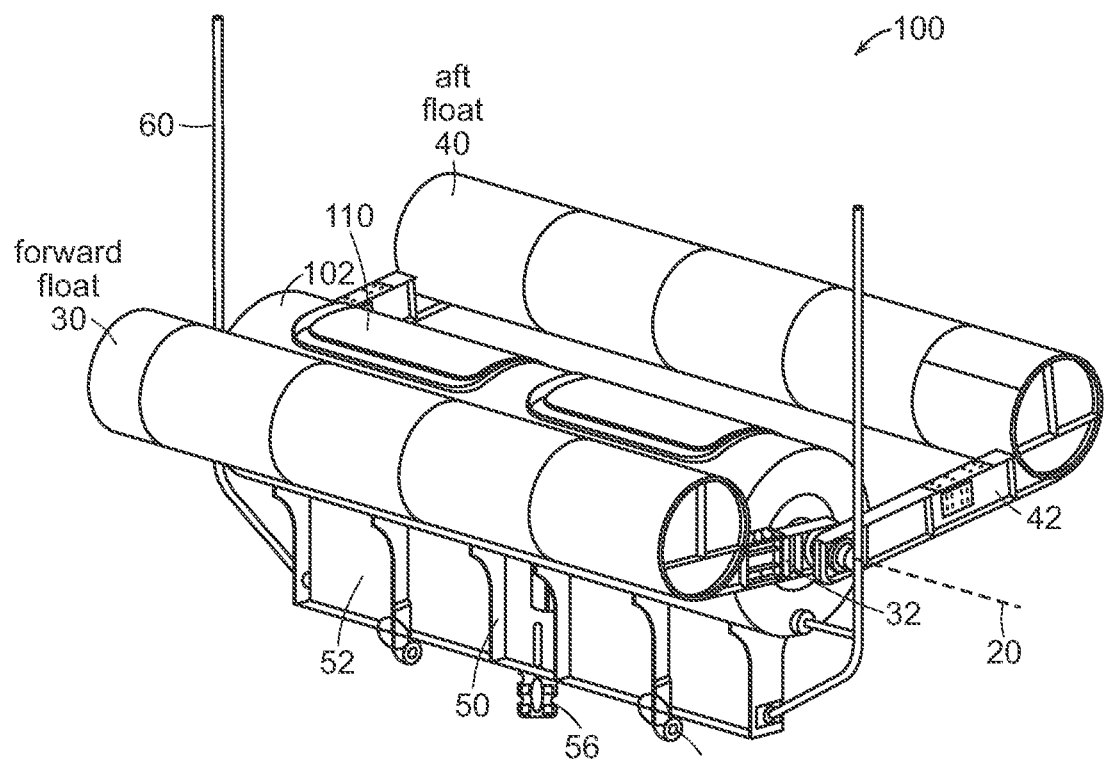
FIG. 1A is a perspective view of the surface component of a wave energy converter according to one embodiment.

The technology of the present disclosure relates to a wave energy converter (WEC) useful for transforming the energy associated with the heave and surge of waves into power. As set forth in more detail below, the WEC may be designed to be agnostic to wave direction. The present disclosure builds upon the technology disclosed in Applicant's earlier patents directed to WEC's which are discussed in U.S. Pat. No. 9,587,620 filed on Sep. 30, 2013, U.S. Pat. No. 8,508,063 filed on Oct. 22, 2012, U.S. Pat. No. 8,314,506 filed on Feb. 22, 2010, and U.S. Pat. No. 8,659,179 filed on Aug. 12, 2013, all of which are incorporated by reference herein in their entirety. These earlier patents disclose wave energy converter technology and describe in detail the internal components of the WEC.

As a general overview, the wave energy converter (WEC) may be used in a range of grid and non-grid connected applications, including but not limited to low-power sensors, marine vehicles and vessels, desalination, aquaculture, offshore oil & gas platforms, electrolysis, and mini- and micro-grid applications. The WEC is a floating, multi-body system having a nacelle buoyantly supportable on a surface of a body of water that converts the heave and surge of offshore swells and storm waves into useful power.

The ultimate aim of a wave energy conversion device (WEC) is to convert one form of energy into another; in this case, in a chain including hydrodynamic conversion to mechanical torque and ultimately to electrical or other transportable and/or useable forms. The nature of the energy resource—including amongst others extremely low speed;

extremely high force; and cyclic, abrupt and stochastic motion—necessitates a unique set of design requirements for a WEC. The operational requirements of a WEC compound this problem. For instance with remote power applications, qualities including but not limited to low-mass, high power-to-weight, and non-complex logistics, are important characteristics. Examples of non-complex logistics include the WEC being able to fit in standard ocean containers, being liftable with fork lift, requiring minimal onsite assembly, and being deployable with lightly-crewed, smaller vessels. Overall design requirements, such as survivability and reliability, coupled with operational requirements, create the need for a novel WEC design.

As set forth in more detail below, the present disclosure is directed to a WEC that, in one embodiment, is a low-mass, high power, rapidly deployable WEC that fits within a standard ocean container. In one embodiment, the WEC is configured for minimal assembly work dockside, and is able to use smaller, lightly manned vessels. In one embodiment, the WEC includes fully-integrated energy storage, and mooring, data, and communications may all be combined in one line. The WEC may be capable of delivering continuous power as required, and it may be designed for multiple sites.

In one embodiment, the WEC is agnostic to wave direction and/or water depth. Computer modeling shows that at the U.S. Navy's Wave Energy Test Site (WETS) for a 2 kW WEC, that the average performance variance vs. wave direction is within 5%. In other words, the WEC does not need to be oriented in any particular direction relative to the wave direction, and the WEC can operate in a wide range of water depths. Also, because the WEC may be agnostic to wave direction, a single mooring line may be used. In some embodiments, the WEC may be described as having a forward side, an aft side, a starboard side, and a port side. One of skill in the art will recognize that these customary terms are intended to provide some reference of one side relative to another side (i.e., the forward side is opposite the aft side, and the starboard side is opposite the port side). One of skill in the art will also recognize that because the WEC can be oriented in any direction relative to wave direction, that these terms are not intended to be limiting.

Aspects of the present disclosure are directed to an improved WEC which was designed with valuable cost reductions in comparison to prior WEC designs. First, the WEC may be designed to minimize nacelle peak pitch speed due to mooring snap loading in extreme seas, which lowers power take off (PTO) peak speed and allows less robust (i.e. less costly) PTO. This may be achieved by a yoke plate to damp nacelle pitch motion, and also by lowering nacelle center of gravity placement relative to center of buoyancy to stable nacelle pitch motion when mooring cables are slack. For example, computer modeling at the U.S. Navy Energy Test Site (WETS) shows that the yoke plate reduces fore PTO peak speed by 28% and aft PTO peak speed by 3%. Second, having a cabled nacelle-to-heave plate connection avoids a rigid structural connection between nacelle and heave plate, allowing reduced capital expenses and operating expenses. These improvements are discussed in more detail below.

Turning now to FIG. 1A, one embodiment of the surface component of a wave energy converter (WEC) 100 is illustrated which includes a nacelle 102 having a central longitudinal axis 20. As set forth in more detail below, the nacelle 102 houses at least one power take off. The WEC 100 has a first body, which includes a first float 30 and a first float arm 32 rotatably coupled to the nacelle 102 on the first side of the nacelle. The first float 30 and the first float arm 32 are configured to rotate about the longitudinal axis 20. As discussed in more detail below, the first body is operatively coupled to the at least one power take off such that relative motion between the first body and the nacelle 102 transforms power in the at least one power take off.

As shown in FIG. 1A, the WEC 100 also has a second body, which includes a second float 40 and a second float arm 42. In one embodiment, the second float 40 and second float arm 42 are fixed to the nacelle 102. In another embodiment, the second float 40 and second float arm 42 are rotatably coupled to the nacelle 102 on the second side of the nacelle. The second float 40 and the second float arm 42 may be configured to rotate about the longitudinal axis 20 of the nacelle 102. As set forth in more detail below, the second body may be operatively coupled to the at least one power take off such that relative motion between the second body and the nacelle 102 generates energy in the at least one power take off.

As shown in FIG. 1A, in one embodiment, the nacelle 102, the first float 30 and the second float each have a substantially cylindrical shaped body which are each substantially parallel with each other. Other shapes and configurations are discussed in more detail below.

Aspects of the present disclosure are directed to a WEC 100 which is designed to withstand the often variable and unpredictable ocean environment. For example, as discussed in more detail below, in one embodiment, the WEC 100 is configured such that, in the event that either float overtops, both the first float 30 and the second float 40 are self-restoring to their respective sides of the nacelle 102. In other words, in the event that the first float 30 rotates to the second side of the nacelle 102, the WEC 100 is configured such that the first float is self-restoring to rotate back to the first side of the nacelle 102. Likewise, in one embodiment, in the event that the second float 40 rotates to the first side of the nacelle 102, the WEC 100 is configured such that the second float 40 is self-restoring to rotate back to the second side of the nacelle 102. Details regarding these self-restoring floats 30, 40, as well as description of additional components shown in FIG. 1A are described more below. As set forth in more detail below, the nacelle 102 may form part of a central body (for example, the central body may be the nacelle in combination with a heave plate and a heave plate connection), and the central body may have a low reserve buoyancy which may assist the floats 30, 40 to be self-restoring.

Aspects of the present disclosure are directed to a WEC design with improved performance characteristics and reduced capital and/or operating costs in comparison to prior WEC configurations. For example, the inventors recognized that energy capture may be improved by minimizing the movement of the nacelle 102, which maximizes the relative movement between each of the first and second floats 30, 40 and the nacelle 102. This is in contrast to some prior WEC designs in which nacelle movement was desired. As set forth in more detail below, the inventors also recognized that WEC performance may also be improved with a central body which has a low reserve buoyancy. These WEC improvements are discussed in more detail below.

Figure 1B:
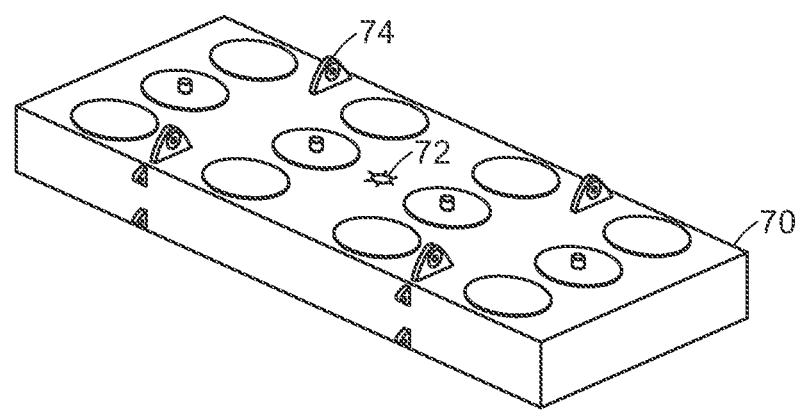
FIG. 1B is a perspective view of a heave plate which may be coupled to the wave energy converter shown in FIG. 1A.

FIG. 1B illustrates a heave plate 70 which may be the lower component of the WEC 100. As set forth in more detail below, the heave plate 70 may enable the WEC 100 to have improved performance characteristics. For example, the heave plate 70 may provide a large surface area and mass to help minimize the movement of the nacelle 102. This mass allocation between the nacelle/yoke and heave plate reduces heave response.

In one embodiment, the WEC is designed to be as small and light as possible for a desired power rating, have a buoyant, low mass nacelle matched with a heave plate with a mass sufficient to achieve desired freeboard. In one embodiment, the WEC is designed where the mass of the nacelle is low relative to the mass of the heave plate.

As shown in FIG. 1A, the WEC 100 may include a yoke 50 extending downwardly from the nacelle 102. A plurality of lines (such as cables 210 in FIG. 3) couple the yoke to the heave plate 70. It should be appreciated that the lines may be rigid (i.e. spar) or flexible (i.e. cables 210). The inventors recognized that the yoke may enable the WEC to have improved performance characteristics and the yoke may also reduce manufacturing costs. With this particular design, one goal is to keep the nacelle mass low and the heave plate mass high which provides a lower overall mass at the surface of the water. By doing so, one can obtain a consistently tensioned cabled nacelle-to-heave plate connection to approximate a fixed or rigid structure which damps heave response through hydrodynamic drag and also reduces heave response through added mass. Further advantages of the yoke 50 are discussed in more detail below. In some embodiments, the WEC 100 may also include a yoke plate 52 which may improve performance and survivability of the WEC, and may also reduce manufacturing costs.

Figure 2:
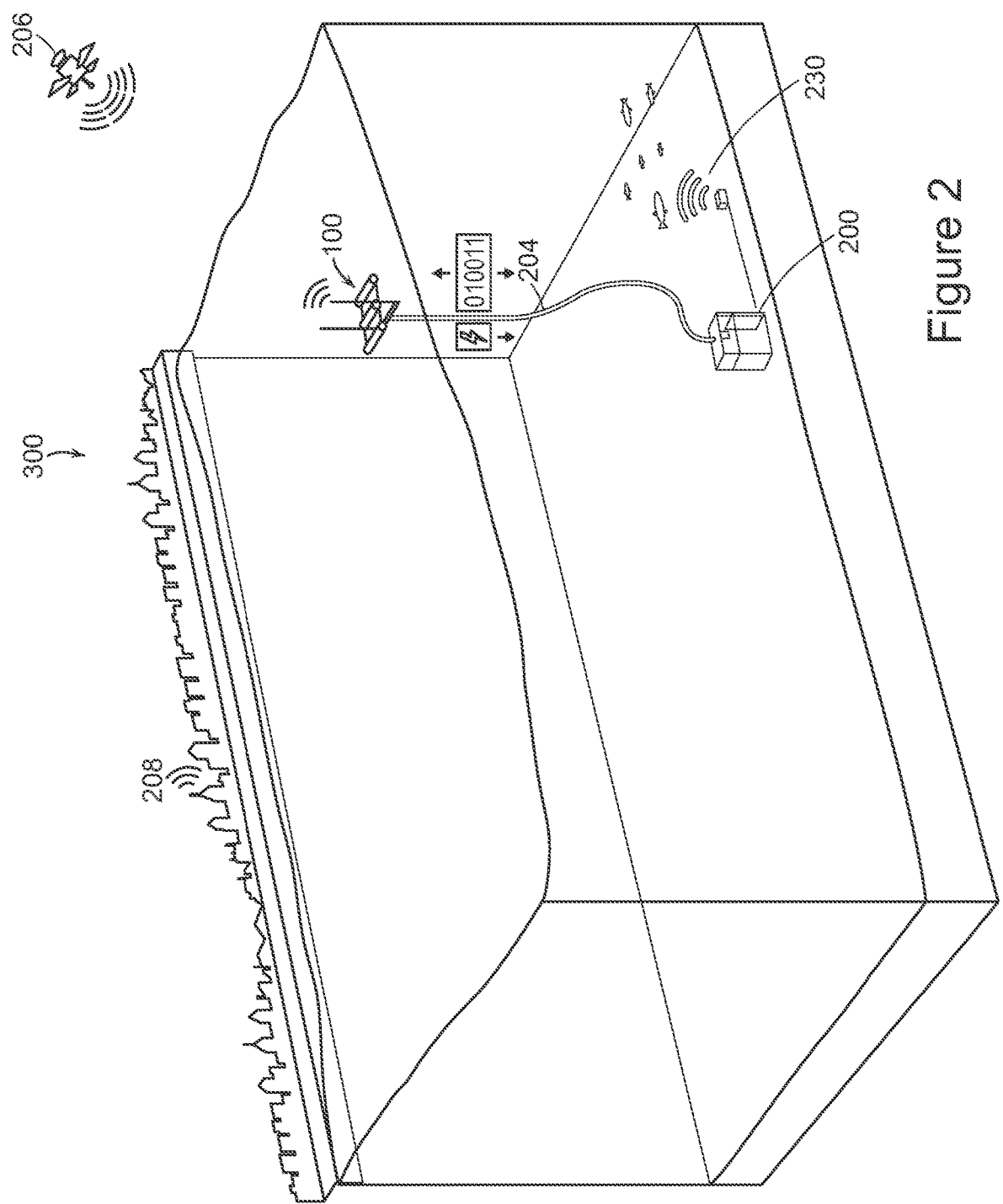
FIG. 2 is a schematic view of an offshore power system which includes a wave energy converter deployed in the ocean.
Figure 4:
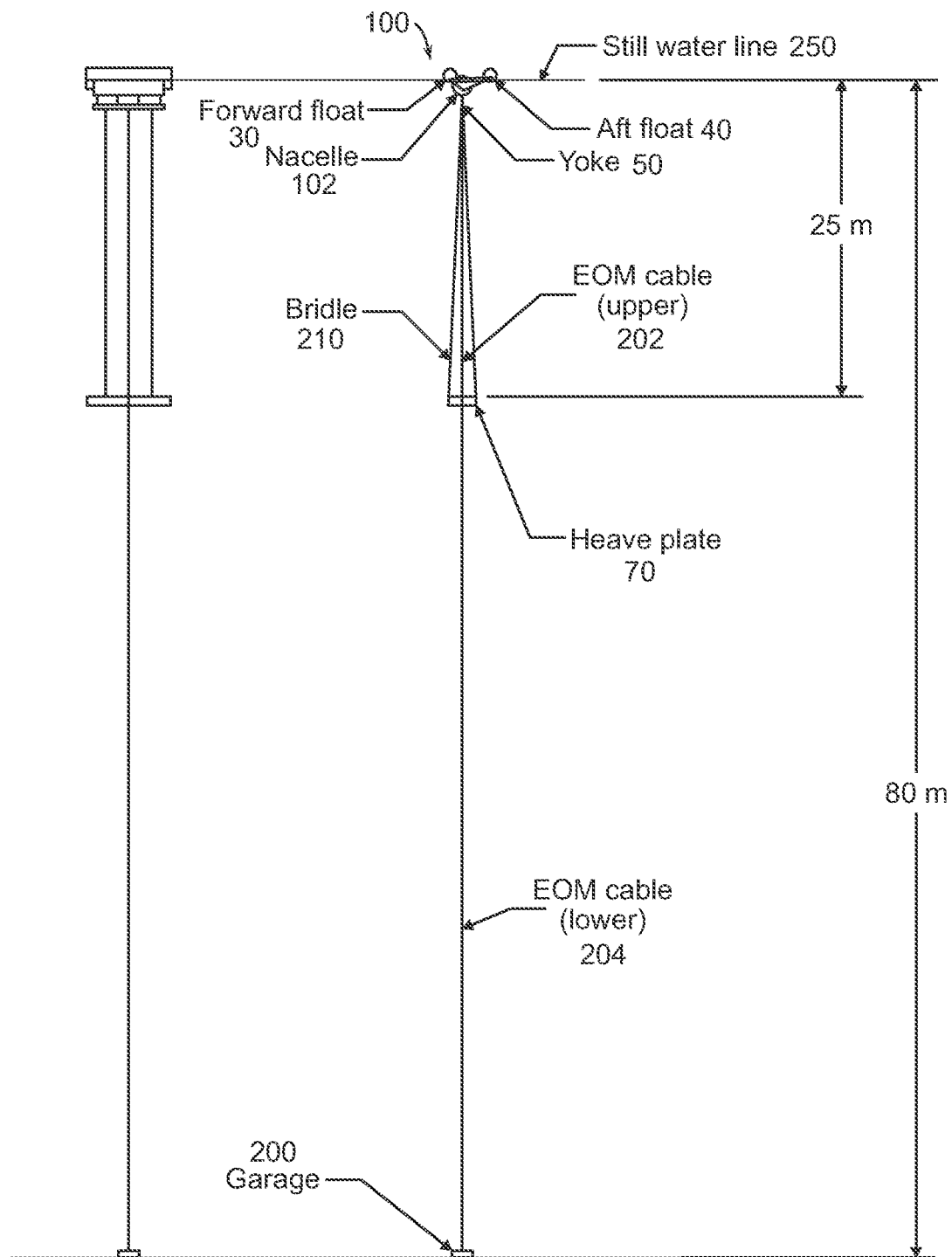
FIG. 4 is a side view of one embodiment of a wave energy converter.

As shown in FIG. 2, aspects of the present disclosure are directed to an autonomous offshore power system 300 which may be deployed in the ocean. In one embodiment, the system 300 is configured for in situ power generation, energy storage, and includes a real-time data and communication system. As shown in FIG. 2, the system 300 includes three primary components. The first component is the water surface component, the WEC 100, which includes the wave energy capture and conversion. The WEC 100 may also include power electronics, communications equipment (ex. LTE, satellite, and/or Wi-Fi communications) and energy storage. The WEC 100 may also include SCADA (Supervisory control and data acquisition) and/or surface payload interfaces. The second component of the offshore power system 300 is a line 204 which may include one or more lines/cables which couple the WEC 100 to the third component, a seafloor base structure 200. The line 204 may include one or more power line(s) and data line(s). The third component of the offshore power system, the seafloor base unit 200, may act as a gravity anchoring element and may include batteries for energy storage, and power and data interfaces for support of subsea equipment. The seafloor base unit 200 may also be referred to as a garage 200 (as shown in FIG. 4). In one embodiment, the base unit 200 includes an anchoring element (such as a frame) which is configured to position the base unit to the ocean floor, and an energy storage device (i.e. battery) may be positioned within the anchoring element. It should be recognized that the energy storage device is coupled to the cable 204 to store energy generated from the WEC 100. In one embodiment, the energy storage device is manufactured by EC-0G in the United Kingdom. It is also contemplated that the seafloor base structure 200 may include a payload interface unit (power, data, and communications) where the payload interface unit may be configured to for distribution of power, wired signals, wireless, and/or acoustic signals. As shown in FIG. 2, this offshore power system 300 may interact with various external communication systems, such as, but not limited to satellite 206 and remote wireless device 208. In one embodiment, the combination of the WEC 100, cable line 204, and the base unit 200 form an autonomous offshore power system (AOPS) which can provide power generation, energy storage and real-time data communication. In one illustrative embodiment, the system 300 also includes a seafloor sensor package 230 which may be integrated with AOPS, and may for example, be obtained from BioSonics, Inc. It should be appreciated that in another embodiment, an energy storage device may be positioned on the heave plate 70 or on the surface of the water. The energy storage device may be coupled to the at least one power take off to store the energy generated by the WEC.

In one embodiment, the offshore power system 300 is designed to support a variety of mobile and static surface and sub-surface payloads, including vehicles, data-gathering systems, and operating equipment. In one embodiment, the offshore power system 300 is able to support multiple payloads simultaneously. It is contemplated that the offshore power system 300 can be moored or drifting. In one embodiment, the offshore power system 300 is capable of power generation from tens of watts to hundreds of kilowatts, or megawatts.

Figure 3:
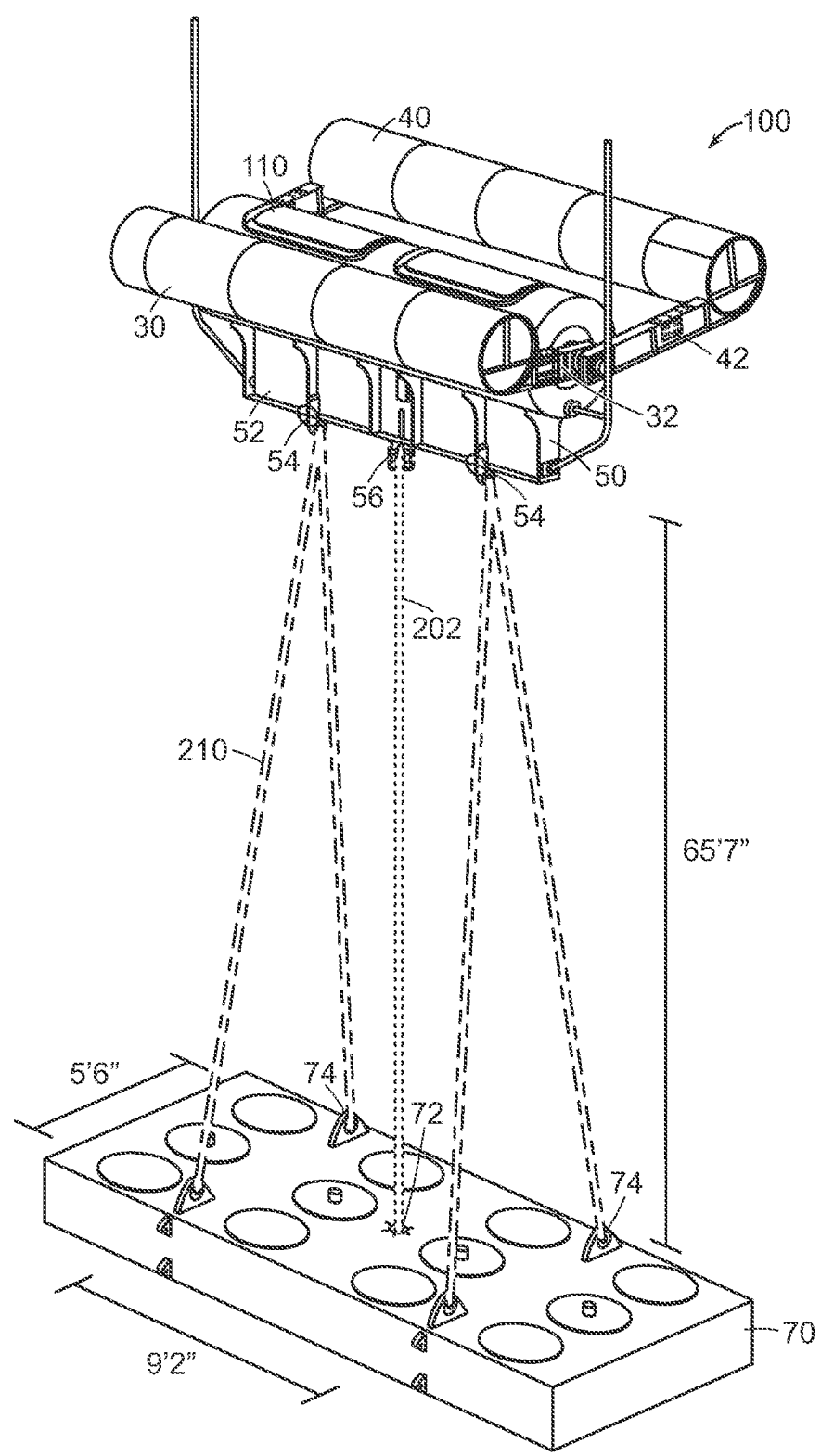
FIG. 3 is a perspective view of one embodiment of a wave energy converter which includes a heave plate.

FIGS. 3 and 4 illustrate one embodiment of the WEC 100 which includes a heave plate 70. The heave plate 70 provides a large surface area to help stabilize the nacelle 102. As shown, a plurality of cables 202, 210 are attached to the base of the yoke 50 and extend downwardly to the heave plate 70. As shown, each of the cables 202, 210 have a lower terminus and the heave plate 70 is attached to the lower terminus of the cables 202, 210. The heave plate 70 is designed to be out of active wave action of the water column to reduce heave excitation forces on the heave plate 70. In one illustrative embodiment, the heave plate 70 is approximately 20-30 meters below the yoke 50 to ensure that it is not positioned in active waves. As shown in FIG. 3, in one illustrative embodiment, the cables 202, 210 are about 65 feet long. In the embodiment shown in FIG. 4, the heave plate 70 is about 25 meters below the still water line of the ocean. In one embodiment, the heave plate 70 and cables 210 attached to the lower portion of the yoke 50 tend to reduce rotation of the nacelle 102 about the longitudinal axis 20.

In one embodiment, the cable 202 is an electro-opto-mechanical (EOM) cable, and may for example, be a 3" OD aluminum, copper, and fiber optic line supplied by EOM Offshore, LLC, of Pocasset, Mass. As shown, an upper end of the cable 202 may attach to coupling 56 centered on the bottom of the yoke 50, and the lower end of the cable 202 may attach to a coupling 72 centered on the heave plate 70. As shown in FIG. 4, upper cable 202 may be coupled to a lower EOM cable 204, which extends down from the heave plate 70. The lower EOM cable 204 may be coupled to an energy storage device in the seafloor base unit 200 (i.e. garage) to store energy generated from the WEC 100. It should also be appreciated that in another embodiment the cables 202 and/or 204 may not contain power and/or data transmission capability and may act as mooring lines.

As shown in FIG. 3, the cables 210 may include four polyester bridle lines, two paired together on one side (i.e. right side) of the yoke 50 and two paired together on the other side (i.e. left side) of the yoke 50. As shown, the upper end of the two cables 210 may attach to one coupling 54 on the bottom of the yoke 50, and the other lower ends of the cables 210 may attach to spaced apart couplings 74 on the heave plate 70. It is generally desirable for each of the cables 210 to remain under tension to avoid snap loading and/or to ensure there is no entanglement risk. It should also be recognized that the WEC may also be configured to prevent twisting of the surface components relative to the heave plate. In one embodiment, the flexible cables 210 may be replaced with rigid spars.

The inventors recognized that one of the advantages of the yoke 50 is that it lowers the nacelle-to-heave plate connection (in comparison to having the cables 202, 210 attach directly to the cylindrical body of the nacelle 102). In other words, by moving the connection point down to the lower portion of the yoke 50, it increases the moment-arm length, which creates increased reaction torque from the heave plate 70, and reduces nacelle rotation about the longitudinal axis 20, which increases floats 30, 40 speed/movement relative to the nacelle.

The inventors recognized that another advantage of the yoke 50 is that it helps with component mass optimization. The addition of the yoke 50 helps to reduce the mass of the nacelle 102 due to less required structural reinforcement in the nacelle, which allows reduced nacelle mass and a higher mass heave plate. This mass allocation reduces nacelle heave and pitch response. In particular, a central body with a low reserve buoyancy and a reduced nacelle mass in conjunction with a heavier heave plate 70 helps to maintain a consistently tensioned cabled nacelle-to-heave plate connection to approximate a fixed or rigid structure. This damps heave response through hydrodynamic drag and reduces response through added mass.

Furthermore, the inventors recognized that by lowering the nacelle-to-heave plate connection, the yoke 50 also maximizes the range of motion and speed of each of the floats 30, 40 relative to the nacelle. In particular, by lowering this connection point away from the nacelle 102, one avoids potential contact of the cables 202, 210 with the floats 30, 40. This increased range of float motion helps to improve energy capture, avoids costs required for added structure or mechanical means to avoid collisions, and minimizing the chance of collision with the nacelle-to-heave plate connection improves survivability. It should also be appreciated that the length of the float arms 32, 42 may also be minimized to increase the float rotational speed gained from heave motion, which leads to improved performance through higher power take off (PTO) efficiency.

It should be recognized that in extreme seas, if the PTO is freewheeling, the floats 30, 40 may contact one or both side of the yoke 50. However, one of ordinary skill in the art will also recognize that this contact can be prevented. Furthermore, the WEC may be designed so that in normal operational seas, there is not contact between the floats 30, 40 and the yoke 50.

Figure 5B:
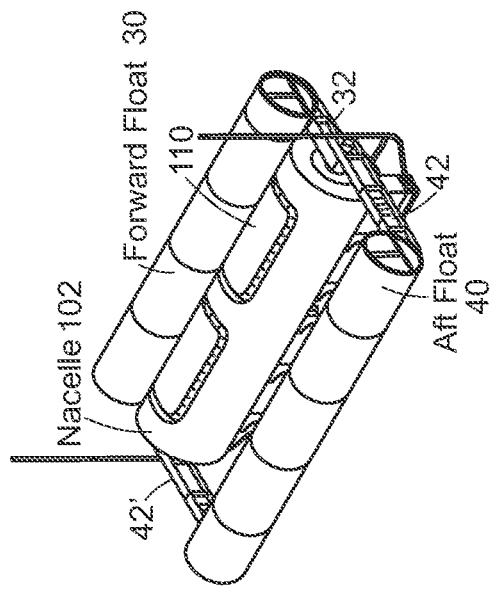
FIG. 5B is a perspective view of the wave energy converter shown in FIG. 1.
Figure 5D:
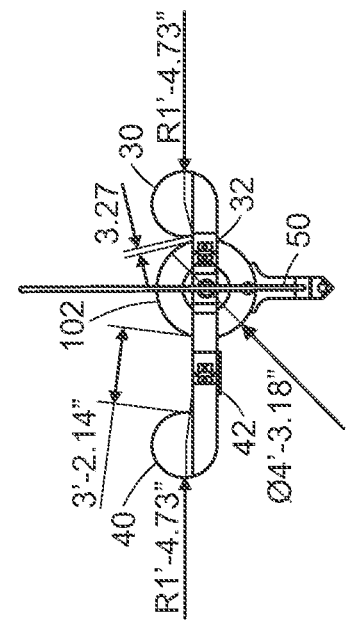
FIG. 5D is a side view of the wave energy converter shown in FIG. 1.
Figure 5A:
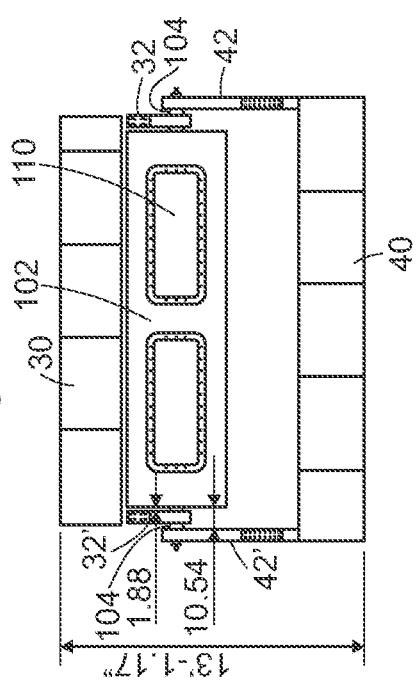
FIG. 5A is a top view of the wave energy converter shown in FIG. 1.
Figure 5C:
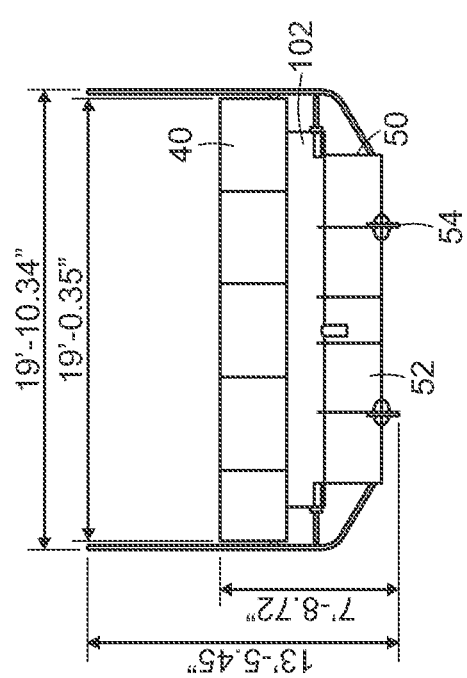
FIG. 5C is a rear view of the wave energy converter shown in FIG. 1.
Figure 6:
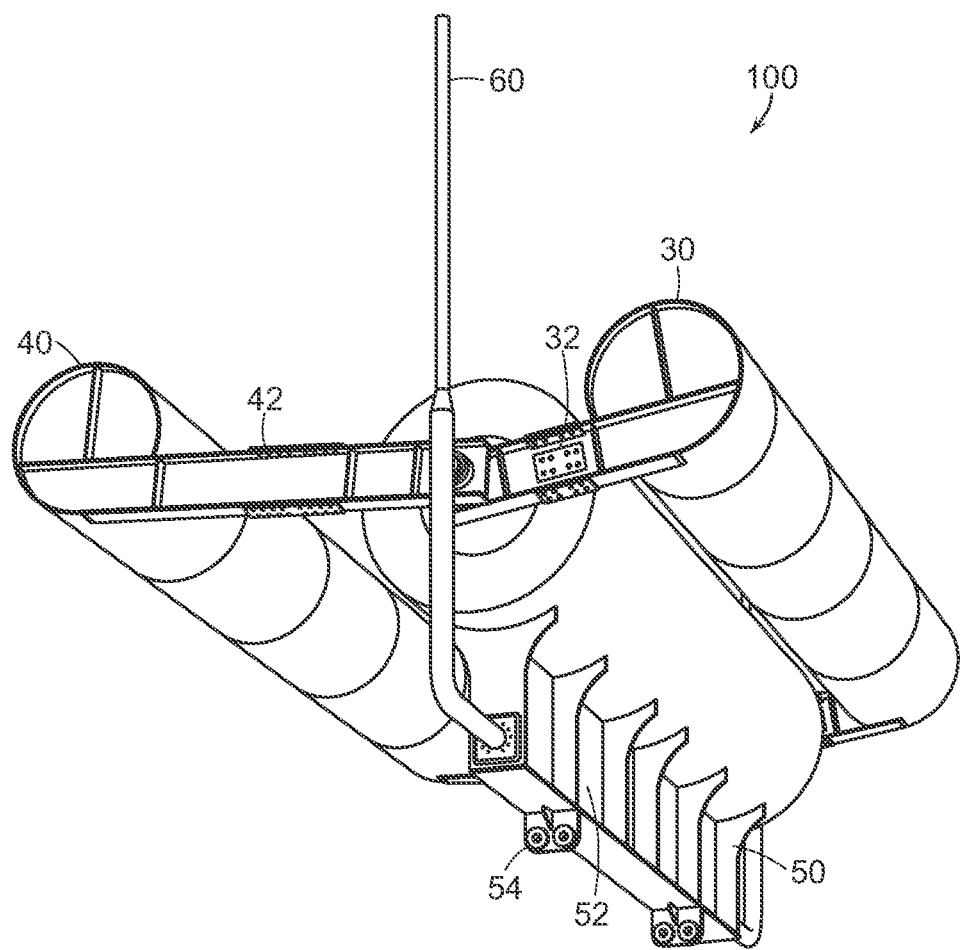
FIG. 6 is a bottom perspective view of the wave energy converter shown in FIG. 1.

As shown in FIGS. 1A, 3, 5 and 6, in one embodiment, the yoke 50 is a downwardly extending frame that extends from the nacelle 102. As shown in FIG. 6, in one embodiment, the yoke 50 includes a plurality of vertical support bars spaced out along the length of the nacelle 102. As shown in FIG. 6, the yoke 50 may also include a lower horizontal bar which connects the plurality of vertical support bars. As shown, the couplings 54, 56 may be secured to the lower horizontal bar of the yoke 50. Also, as shown in FIG. 6, in one embodiment, the plurality of vertical support bars are Y-shaped, following the curvature of the nacelle 102, and also allowing greater range of motion of the floats. In one embodiment, the yoke 50 further includes a yoke plate 52 which may extend substantially the length of the yoke 50. The yoke plate 52 may be configured to minimize performance loss when both floats 30, 40 are on the same side by increasing nacelle drag and providing added mass against pitch rotation of the nacelle 102. Furthermore, lowering the nacelle center of gravity placement relative to the center of buoyancy may be desirable to stabilize nacelle pitch motion to maintain taut cables. In one embodiment, the yoke plate 52 provides stability to the nacelle 102 which reduces the tendency of nacelle-to-heave plate cable entanglements. In one illustrative embodiment, the yoke plate 52 has a substantially planar rectangular shaped body. In other embodiment, the yoke plate 52 may be configured as other solid structures, as the disclosure is not so limited.

In one embodiment, the yoke 50 and/or the yoke plate 52 may be configured for adjusting and fine tuning of the buoyancy of the system. For example, it is contemplated that a plurality of modular buoyancy elements may be selectively added to the yoke 50 and/or the yoke plate 52 to adjust the buoyancy. In one embodiment, these modular buoyancy elements may be fiberglass cubes or bubbles and the yoke 50 and/or yoke plate 52 may include a plurality of attachment mechanisms to secure these modular buoyancy elements. It is contemplated that the modular buoyancy elements may be designed to be added in situ.

Figure 7:
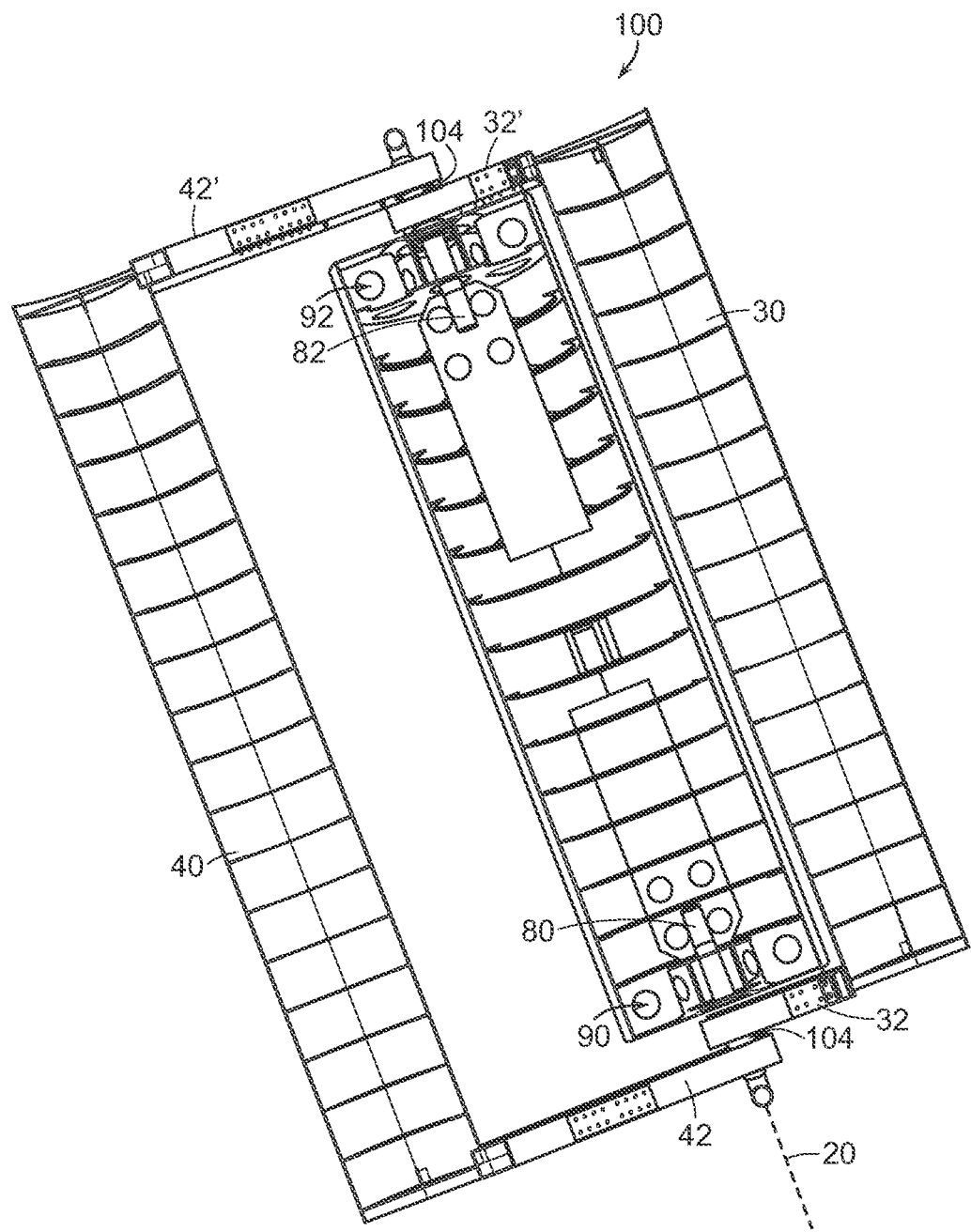
FIG. 7 is a cross-sectional view of the wave energy converter shown in FIG. 1.

Turning to FIGS. 5-7, further details of the WEC 100 will now be more fully described. As shown in FIGS. 5 and 7, the nacelle 102 may further includes a nacelle tube 104 having a first end extending outwardly from a first side of the nacelle 102 and a second end extending outwardly from a second opposite side of the nacelle 102. As shown, the first float arm 32 may include a primary first float arm 32 rotatably coupled to one side of the nacelle tube 104, and a secondary first float arm 32' roatably coupled to the other side of the nacelle tube 104. Similarly, as shown in FIGS. 5A, 5B and 7, the second float arm 42 may include a primary second float arm 42 rotatably coupled to the first side of the nacelle tube 104, and a secondary second float arm 42' rotatably coupled to the other side of the nacelle tube 104. It should be recognized that in one embodiment, the primary float arm may act as the drive arm, and the secondary float arm may act as the idler arm. As shown in the cross-sectional view of FIG. 7, the primary first float arm 32 and/or the primary second float arm 42 may act as the drive arm and may be operatively coupled to a first drive shaft 80 positioned inside of the nacelle 102. Furthermore, the secondary first float arm 32' and/or the secondary second float arm 42' may be operatively coupled to a second drive shaft 82 positioned inside of the nacelle 102. As set forth in greater detail in Applicant's earlier patents mentioned above, movement of the float arms 32, 32', 42, 42' in turn moves the drive shafts 80, 82 which in turn transform power in at least one power take off inside of the nacelle. In one illustrative embodiment, there is a first power take off 90 associated with the first drive shaft 80, and a second power take off 92 associated with the second drive shaft 82. In one embodiment, movement of the first body (i.e. the first float 30 and the first float arms 32, 32') transforms power in a first power take off, and movement of the second body (i.e. the second float 40 and the second float arms 42, 42') transforms power in a second power take off. In another embodiment, it is also contemplated that the first float 30 and the second float 40 are coupled to the same power take off, as the disclosure is not so limited.

Details regarding the specific power take off (PTO) configuration may be found in Applicant's earlier patents directed to WEC's such as U.S. Pat. No. 9,587,620 filed on Sep. 30, 2013, U.S. Pat. No. 8,508,063 filed on Oct. 22, 2012, U.S. Pat. No. 8,314,506 filed on Feb. 22, 2010, and U.S. Pat. No. 8,659,179 filed on Aug. 12, 2013, all referenced above. In one embodiment, the PTO includes a mechanical or a magnetic gear system. One of ordinary skill in the art will appreciate that such PTO may, in some embodiments, comprise one or more direct drive generator (s), gearbox drive generator(s), hydraulic system(s), pumping system(s), water pump(s), water desalinator(s), pneumatic pump(s), hydraulic pump(s), electrolyzer(s) etc. For various pump and hydraulic-related embodiments, the drive shaft/hub may be directly or indirectly connected to, for example an impeller, compressor rotor, and/or mechanical turbine rotor. In some electrical generation embodiments the drive shaft/hub may be directly or indirectly connected to, for example, one or more rotors and/or stators. However, it will be understood, in view of this disclosure, that many design alternatives to the above exist for PTO components mounted within a nacelle and that these alternatives are within the scope of this disclosure.

One of ordinary skill in the art will appreciate that in power generation applications, rotary-driven PTOs 90, 92 may include one or more rotor segments, which are rotatable in relation to one or more stator segments. As set forth in more detail in Applicant's earlier patents listed above, relative rotation between the rotor segments and stator segments may be achieved by way of drive bearings, or any other bearing or similar mechanism which allows one or more components to freely rotate about or within another component. The rotors may be operatively connected to any drive shaft/hub via any suitable means.

As shown in FIG. 7, the drive shafts 80, 82 may generally rotate about the longitudinal axis 20 on drive bearings or other suitable structures. In various embodiments, the drive shafts 80, 82 may be sealed by one or more seals to prevent the intrusion of seawater and/or harmful foreign objects/debris. In one embodiment, the first and second power take offs 90, 92 each have a rotor assembly and a stator assembly, where the rotor assemblies of the first power take off and the second power take off rotate about the longitudinal axis 20.

In some embodiments, the rotary-driven PTOs may include mechanical or magnetic gear systems. However, the technology described herein may be implemented using rotary-driven PTOs of any type, including, but not limited to, direct drive systems, generator(s), gearbox and generator(s), hydraulics and generator(s), water pump(s), and/or any other suitable rotary PTO device.

As mentioned above, aspects of the present disclosure are directed to a nacelle 102 with a low reserve buoyancy. As a brief overview, reserve buoyancy is the watertight volume of a body above the still water line, expressed as a percentage of the total buoyancy (volume). For example, a hypothetical nacelle having a reserve buoyancy of 50% would be configured so that 50% of its watertight volume is above a still water line and the other 50% of its volume is below a still water line. One can appreciate that in such a hypothetical configuration, the still water line would pass through the longitudinal axis of the nacelle.

As mentioned above, the combination of the nacelle 102, heave plate 70, yoke 50 and cables 210 may form a central body of the WEC 100. The inventors recognized that a low reserve buoyancy (LRB) of the central body (i.e. nacelle 102, heave plate 70, yoke 50 and cables 210 which provides the nacelle-to-heave plate connection) is desirable to minimize the heave response to hydrodynamic forces. This concept is illustrated in FIG. 4 which shows that at least 50% of the central body (i.e. nacelle 102, heave plate 70 and yoke 50) is positioned under the still water line. As shown in FIG. 4, the still water line 250 is above the longitudinal axis of the nacelle 102. In one embodiment, float buoyancy is optimized at 50% reserve buoyancy to have the same force acting in both the clockwise and counter clockwise directions.

In one embodiment, the reserve buoyancy of the nacelle central body (i.e. nacelle 102, heave plate 70 and yoke 50) is less than 45%. In other words, at least 55% of the central body is positioned under a still water line. In other embodiments, the reserve buoyancy of the nacelle central body (i.e. nacelle 102, heave plate 70 and yoke 50) is less than 40%, 30%, 20%, 10%, 5%, or 3%. In other words, at least 60%, 70%, 80%, 90%, 95%, or 97% of the central body is positioned under a still water line. In one particular embodiment, the reserve buoyancy of the nacelle central body (i.e. nacelle 102, heave plate 70 and yoke 50) is about 2.3%. In other words, approximately 97.7% of the central body is positioned under a still water line.

Figure 8:
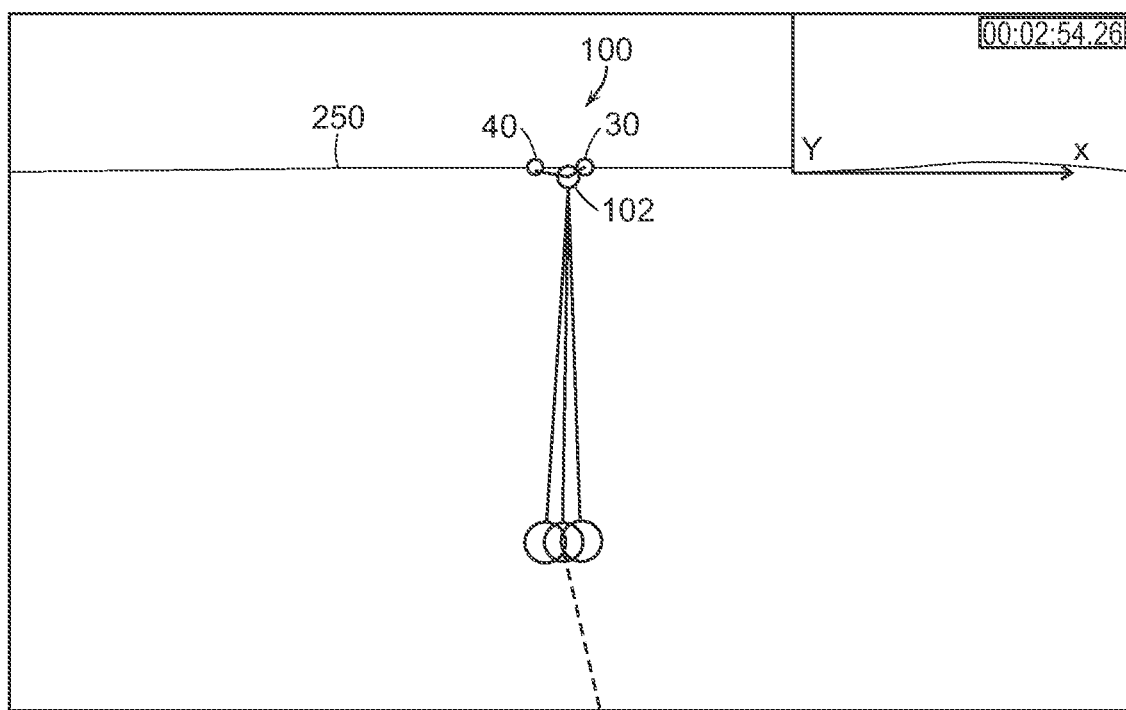
FIG. 8 is a screen shot of a simulation of one embodiment of a wave energy converter.

This concept of a low reserve buoyancy of the central body is also shown in FIG. 8 which is a screen shot of a simulation of one embodiment of a wave energy converter 100 deployed in an ocean having a still water line 250. Furthermore, as shown in FIGS. 4 and 8, the reserve buoyancy of the nacelle 102 is lower than the reserve buoyancy of either of the first float 30 or the second float 40. As shown, when the WEC is placed in the water, this gives the WEC a substantially V-shaped configuration, with the lower nacelle 102 at the bottom of the "V" and the first and second floats 30, 40 angled upwardly to form the top of the "V".

Figure 9A:
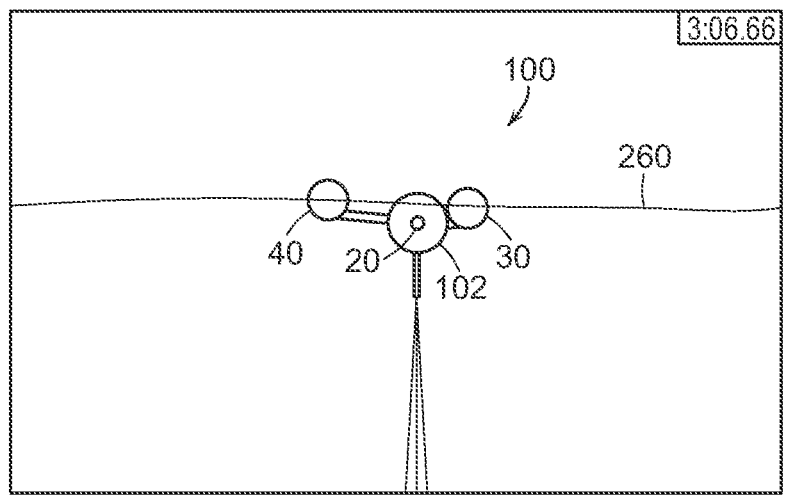
FIG. 9A-9E are screen shots of a simulation of one embodiment of a wave energy converter taken at different times to illustrate movement of the wave energy converter in a simulated wave.

FIG. 9A-9E are screen shots of a simulation of one embodiment of a wave energy converter 100 taken at different times over approximately a six second time interval to illustrate movement of the wave energy converter 100 in a simulated wave. As shown in FIG. 9A, in an initial position at 3:06.66 minutes, the first float 30 and the second float 40 are each in their normal resting position relative to the nacelle 102. FIG. 9A also shows that the reserve buoyancy of the nacelle 102 is lower that the reserve buoyancy of either of the first float 30 and the second float 40. Furthermore, the water line 260 is well above the longitudinal axis 20 of the nacelle 102.

Figure 9B:
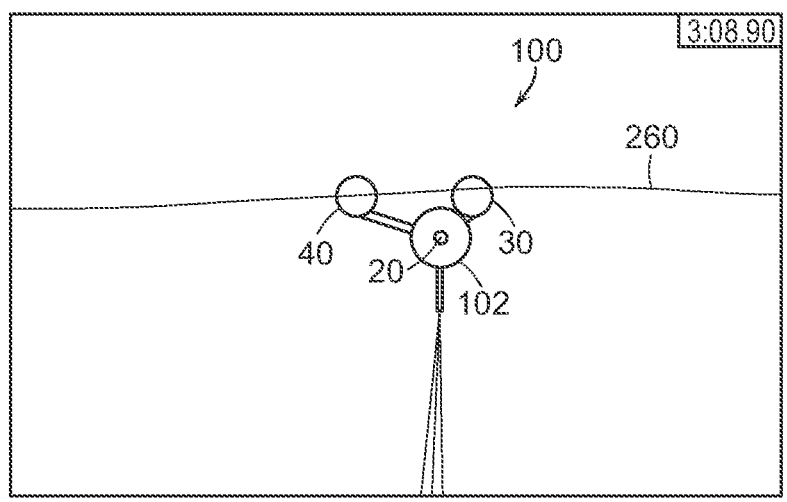
Figure 9C:
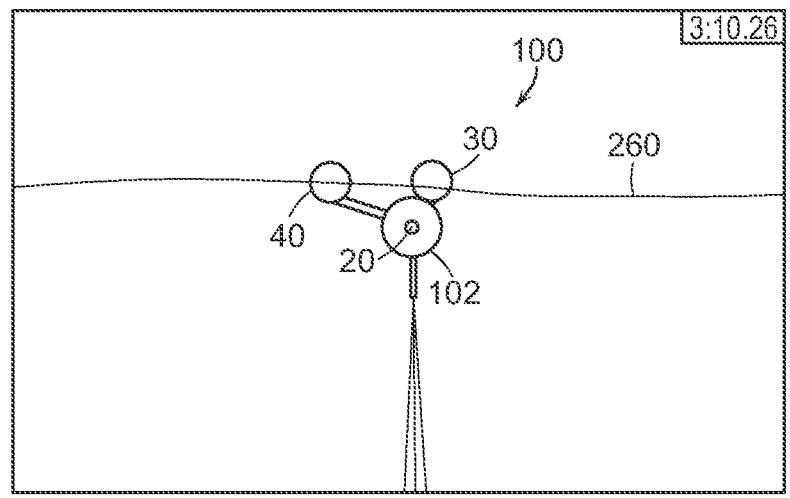
Figure 9D:
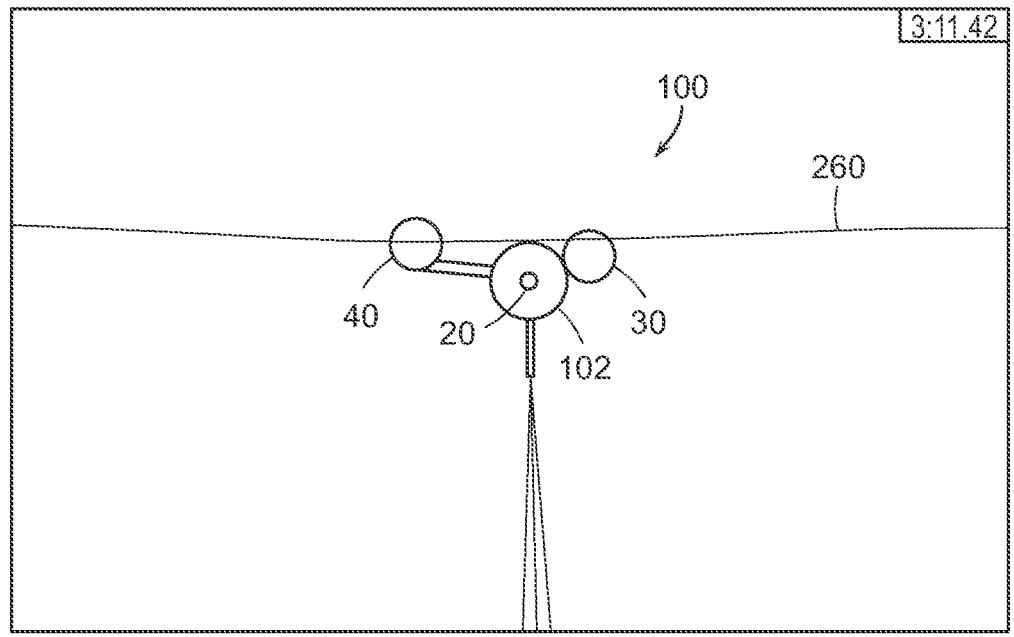
Figure 9E:
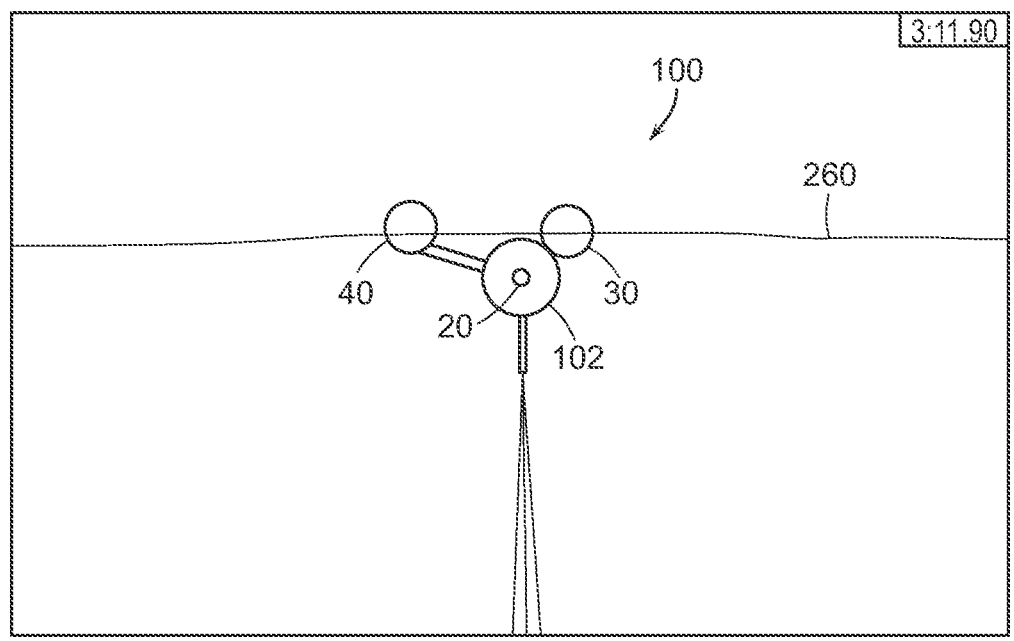

FIG. 9B illustrates a wave approaching the WEC 100 from the first side at 3:08.90 minutes. As shown, the wave causes the water line 260 to rise which rotates the first float 30 up relative to the nacelle 102 in a counterclockwise direction and also rotates the second float 40 up relative to the nacelle 102 in a counterclockwise direction. As shown, both the first float 30 and the second float 40 rotates about the longitudinal axis 20 of the nacelle 102. As shown in FIG. 9C, at 3:10.26 minutes this wave may cause the floats 30, 40 to continue to move upwardly until a peak position is reached. As shown in FIG. 9D, at 3:11.42 minutes as the wave passes the WEC 100, both of the floats 30, 40 rotate back down into their original resting position, the first float 30 rotating down in a clockwise direction and the second float 40 rotating down in a counterclockwise direction. FIG. 9E illustrates at 3:12.90 minutes, another wave approaching from the first side which again causes the water line 260 to rise which rotates the first float 30 up relative to the nacelle 102 in a counterclockwise direction and also rotates the second float 40 up relative to the nacelle 102 in a counterclockwise direction. As discussed, this movement of each of the first and second floats 30, 40 relative to the nacelle 102 generates energy in the one or more power takeoffs 90, 92 housed inside of the nacelle 102. FIGS. 9A-9E also illustrates the limited movement of the low reserve buoyancy nacelle 102 and how the heave plate limits nacelle heave and pitch which is critical to energy capture.

The inventors recognized that a low reserve buoyancy of the combined low mass nacelle 102 and high mass heave plate 70 is desirable to enable the floats 30, 40 to self-return to nominal operating position in the event of overtopping. In other words, the low reserve buoyancy enables the floats 30, 40 to self-restore to their designated side. The Applicant has conducted extensive simulation using physics modeling software, ANSYS Aqwa. In one simulation study in a particular sea state, it is estimated that a float overtop occurrence may occur approximately 3000 times per year. This simulation study showed that the WEC 100 described above, in about 95% of the time, the first and second floats 30, 40 operate on their preferred (i.e. designated) sides. This means that when either float 30, 40 overtops, it will soon rotate back to its designated side. Prior WEC designs required mechanical intervention to restore the floats 30, 40. This is in contrast to the present disclosure in which the WEC floats 30, 40 are self-correcting when they overtop.

Figure 10B:
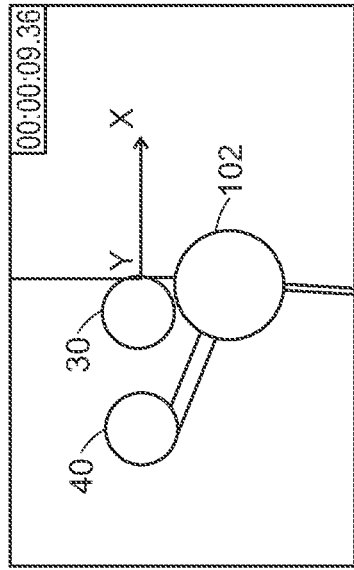
FIGS. 10A-10D are screenshots of a simulation of one embodiment of a wave energy converter taken at different times to illustrate how the floats self-restore to normal operating position in the event of overtopping.
Figure 10D:
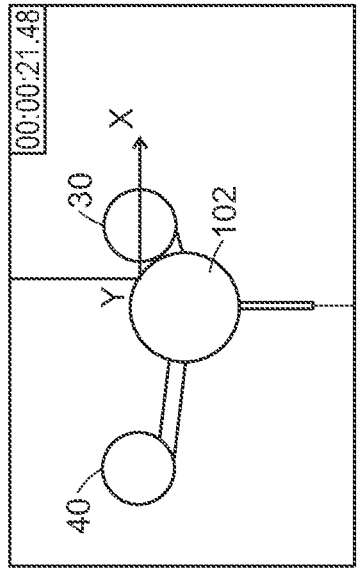
Figure 10A:
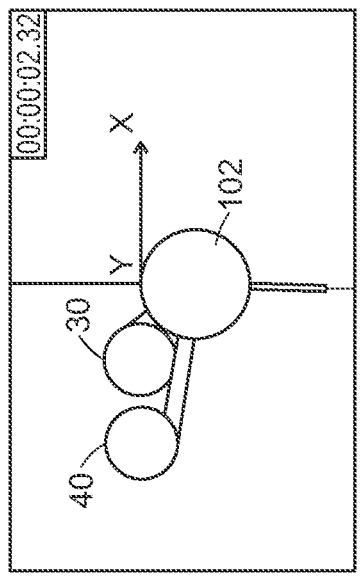
Figure 10C:
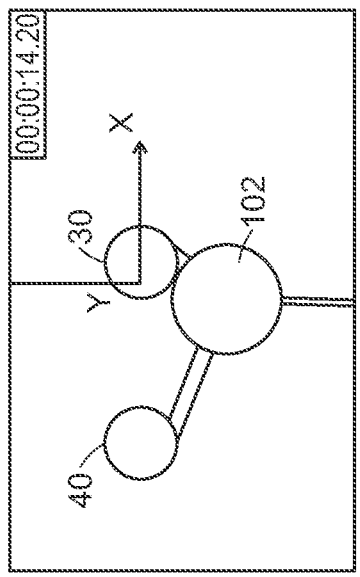

FIGS. 10A-10D are screenshots of a simulation of one embodiment of a WEC 100 taken at different times over approximately a twenty second time interval to illustrate how the low reserve buoyancy of the central body enables the floats 30, 40 to self-restore to normal operating position in the event of overtopping. In particular, FIG. 10A illustrates the first float 30 in an overtopped position where it has rotated to the second side of the nacelle 102. FIGS. 10B-10D illustrate the first float 30 automatically moving back to the first side of the nacelle 102. As shown in FIG. 10B, the nacelle 102 gets pushed below the water line due to the low reserve buoyancy of the central body, and also due to the force of the first float's center of buoyancy and center of gravity placement. This causes the first float 30 to be unstable in the overtopped position, and as shown in FIG. 10C, the first float 30 will continue to rotate back to the first side, until it reaches its equilibrium position shown in FIG. 10D.

The inventors have also recognized that center of gravity placement relative to center of buoyancy causes the normal operating position of each of the floats 30, 40 to be the only stable position, which also forces self-return to the normal operating position. The inventors recognize that this may also be a result of the drive arms 32, 42 being offset from the center of each float 30, 40, and also the solid ballast in each float 30, 40 also being offset from the center.

Energy production may continue when one of the floats 30, 40 overtops, but energy capture is optimized when the two floats 30, 40 are in their normal operating position (i.e. first float 30 on the first side of the nacelle 102, and second float on the second side of the nacelle 102 opposite the first float 30). In this configuration, the floats 30, 40 apply equal and opposite torque against the nacelle 102, minimizing nacelle motion and maximizing relative float-to-nacelle motion. As mentioned above, in another embodiment, the second float 40 may be fixed to the nacelle 102.

In one embodiment, the second float arms 42, 42' are longer than the first float arms 32, 32'. For example, in one embodiment the second float arm 42 is about two times longer than the first float arm 32. The arm length ratio may, for example, be 1.8:1, and the PTO damping ratio may be about 2:1. This results in a torque ratio of approximately 1:1 (or 1:0.9). It should be appreciated that torque balancing between the first and second floats 30, 40 may be done electrically. In one embodiment, the reserve buoyancy of the first float arm 32 and/or the second float arm 42 is greater than the reserve buoyancy of the nacelle 102 when the WEC is placed in water.

As shown in the figures, the WEC 100 may be configured such that the first float 30 is nestable within the second float 40. In other words, the first float 30 is configured to rotate about the longitudinal axis 20 within a radial span bounded by an outer surface of the nacelle 102 and a radially distal end of the second float 40. It should be appreciated that this nested float design prevents one float from interfering with the movement of the other float, which may help to improve energy capture, performance and costs. In this nested float configuration, mechanical end stops and/or range of motion restrictors are not required to prevent one float from interacting with the other float. Furthermore, nested floats permit the floats to overtop. As discussed above, this disclosure relates to a nestable float configuration in which each float is self-restoring in the event either float overtops.

In one embodiment, the nacelle 102 may be described as a substantially watertight housing within which one or more rotary-driven power take offs 90, 92 may be housed. In one embodiment, the nacelle 102 may include an empty buoyant shell, which may contain power generation, maintenance, and/or other equipment, or may be used for any other suitable purpose. It is also contemplated that in one embodiment, portions of the central body may be open.

The nacelle 102 may be produced from composite material (e.g., carbon fiber, Kevlar, fiberglass, etc.), concrete, rolled steel, aluminum, and/or any other suitable metal or alloy. In one embodiment, the nacelle 102 may include nacelle access hatches 110 for loading and offloading equipment and personnel (e.g., for maintenance and repairs). It should be appreciated that in another embodiment, the WEC 100 components may be relatively small in scale and thus any access hatches 110 may be small and not intended for personnel ingress.

In one embodiment, the first and second floats 30, 40 are both filled with a closed cell foam material and contain no voids for water intrusion. In another embodiment, the first and second floats 30, 40 may be filled with other low density, non-absorbent materials or components such as a gas-filled bladder, and in another embodiment, the floats 30, 40 may be unfilled. In one embodiment, even in the unlikely event that the nacelle is filled with water, the WEC 100 will stay on the surface of the water as the first and second floats 30, 40 will maintain positive buoyancy. It should be appreciated that a buoyant foam material may enable the floats 30, 40 to have a reserve buoyancy higher than the reserve buoyancy of the nacelle 102. One of ordinary skill in the art would appreciate that the material selection for the nacelle 102 and the floats 30, 40 may be altered such that the reserve buoyancy of the nacelle 102 is lower than the reserve buoyancy of either of the first float 30 and the second float 40.

As mentioned above, in one embodiment, the nacelle 102, the first float 30 and the second float each have a substantially cylindrical shaped body. It is contemplated that a cylindrical shape may optimize the strength-to material and it may be easily fabricated which may reduce manufacturing costs. Other shapes, such as but not limited to rectangular, spherical, and irregular shaped bodies are also contemplated for the nacelle 102 and first and second floats 30, 40.

FIGS. 5A, 5C and 5D illustrate dimensions of the WEC 100 according to one embodiment. In this particular embodiment, the nacelle 102, first float 30 and the second float 40 are each about 19 feet in length. It should be recognized that in other embodiments, the dimensions may vary.

In some embodiments, one or more communication masts 60 can extend upward from the yoke 50 to operate an accessory (e.g., antenna, solar panel, warning light, etc.). As shown in FIG. 1A, in one embodiment, the communication masts 60 extend upwardly from each end of the yoke 50.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein.

In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A wave energy converter comprising:
    a central body including a nacelle, the nacelle having a first side, a second side, and a longitudinal axis, the nacelle housing at least one power take off;
    a first float and a first float arm coupled to the nacelle on the first side;
    a second float and a second float arm coupled to the nacelle on the second side;
    wherein the first float is rotatably coupled to the nacelle, the first float and the first float arm forming a first body configured to rotate about the longitudinal axis, wherein the first body is operatively coupled to the at least one power take off such that relative motion between the first body and the central body generates energy in the at least one power take off; and
    wherein the central body has a low reserve buoyancy, wherein the reserve buoyancy of the central body is lower than the reserve buoyancy of either of the first float and the second float, to minimize a heave response of the central body relative to the first float to increase output of the wave energy converter.

2. The wave energy converter of claim 1, wherein the second float is rotatably coupled to the nacelle, the second float and the second float arm forming a second body configured to rotate about the longitudinal axis, wherein the second body is operatively coupled to the at least one power take off such that relative motion between the second body and the central body generates energy in the at least one power take off.

3. The wave energy converter of claim 2, wherein the central body has a low reserve buoyancy such that in the event that either the first float rotates to the second side of the nacelle, or the second float rotates to the first side of the nacelle, both the first float and the second float are self-restoring back to their respective first and second sides.

4. The wave energy converter of claim 2, wherein the at least one power take off includes a first power take off and a second power take off, wherein the first body is operatively coupled to the first power take off through the first float arm and the second body is operatively coupled to the second power take off through the second float arm.

5. The wave energy converter of claim 4, wherein the first and second power take offs each have a rotor assembly and a stator assembly, and wherein the rotor assemblies of the first power take off and the second power take off rotate about the longitudinal axis.

6. The wave energy converter of claim 1, wherein the central body has a low reserve buoyancy such that in the event that the first float rotates to the second side of the nacelle, the first float is self-restoring back to the first side.

7. The wave energy converter of claim 1, wherein the reserve buoyancy of the central body is less than 45%, such that at least 55% of the central body is positioned under a still water line.

8. The wave energy converter of claim 1, wherein the nacelle, the first float, and the second float each have a substantially cylindrical shaped body.

9. The wave energy converter of claim 1, wherein the second float arm is longer than the first float arm.

10. The wave energy converter of claim 1, wherein the first float is nestable within the second float.

11. The wave energy converter of claim 1, wherein the nacelle further comprises:
    a nacelle tube having a first end extending outwardly from a first side of the nacelle and a second end extending outwardly from a second side of the nacelle;
    wherein the first float arm includes a primary first float arm rotatably coupled to the first side of the nacelle tube, and a secondary first float arm rotatably coupled to the second side of the nacelle tube; and
    wherein the second float arm includes a primary second float arm rotatably coupled to the first side of the nacelle tube, and a secondary second float arm rotatably coupled to the second side of the nacelle tube.

12. The wave energy converter of claim 1, wherein the central body further comprises:
    a plurality of lines extending downwardly from the nacelle; and
    a heave plate attached to the plurality of lines.

13. The wave energy converter of claim 12, wherein the central body further comprises:
    a yoke extending downwardly from the nacelle; and
    wherein the plurality of lines attach to the base of the yoke, each of the plurality of lines having a lower terminus, where the heave plate is attached to the lower terminus of each of the plurality of lines.

14. The wave energy converter of claim 13, wherein the central body further comprises:
    a yoke plate extending substantially the length of the yoke.

15. The wave energy converter of claim 1, further comprising:
    an energy storage device, wherein the energy storage device is configured to be coupled to the at least one power take off.

16. The wave energy converter of claim 1, further comprising:
- at least one line extending downwardly from the nacelle, wherein the at least one line includes at least one of a mooring line and an electro-opto-mechanical (EOM) cable.

17. The wave energy converter of claim 16, in combination with a base unit, the base unit comprising:
- an anchoring element which is configured to position the base unit on an ocean floor;
- an energy storage device associated with the anchoring element, wherein the energy storage device is configured to be coupled to the EOM cable;
- a payload interface unit associated with the anchoring element, wherein the payload interface unit is configured for distribution of power, wired signals and/or wireless signals; and
- wherein the combination of the wave energy converter and the base unit form an autonomous offshore power system (AOPS) which can provide power generation, energy storage and real-time data communication.

18. A wave energy converter comprising:
- a central body including a nacelle, the nacelle having a first side, a second side, and a longitudinal axis, the nacelle housing at least one power take off;
- a first float and a first float arm coupled to the nacelle on the first side;
- a second float and a second float arm coupled to the nacelle on the second side;
- wherein the first float is rotatably coupled to the nacelle, the first float and the first float arm forming a first body configured to rotate about the longitudinal axis, wherein the first body is operatively coupled to the at least one power take off such that relative motion between the first body and the central body generates energy in the at least one power take off;
- wherein the central body further comprises:
  - a yoke extending downwardly from the nacelle;
  - a plurality of lines attached to the base of the yoke and extending downwardly, each of the plurality of lines have a lower terminus; and
  - a heave plate attached to the lower terminus of each of the plurality of lines, wherein the heave plate and lines attached to the lower portion of the yoke tend to reduce rotation of the nacelle;
- wherein the second float is rotatably coupled to the nacelle, the second float and the second float arm forming a second body configured to rotate about the longitudinal axis, wherein the second body is operatively coupled to the at least one power take off such that relative motion between the second body and the central body generates energy in the at least one power take off; and
- wherein the central body has a low reserve buoyancy, and wherein the reserve buoyancy of the nacelle is lower than the reserve buoyancy of either of the first float and the second float, such that in the event that either the first float rotates to the second side of the nacelle, or the second float rotates to the first side of the nacelle, both the first float and the second float are self-restoring back to their respective first and second sides.

19. The wave energy converter of claim 18, wherein the nacelle, the first float, and the second float each have a substantially cylindrical shaped body.

20. The wave energy converter of claim 18, wherein the second float arm is longer than the first float arm.

21. The wave energy converter of claim 18, wherein the first float is nestable within the second float.

22. The wave energy converter of claim 18, wherein the nacelle further comprises:
- a nacelle tube having a first end extending outwardly from a first side of the nacelle and a second end extending outwardly from a second side of the nacelle;
- wherein the first float arm includes a first forward float arm rotatably coupled to the first side of the nacelle tube, and a second forward float arm rotatably coupled to the second side of the nacelle tube; and
- wherein the second float arm includes a first aft float arm rotatably coupled to the first side of the nacelle tube, and a second aft float arm rotatably coupled to the second side of the nacelle tube.

23. The wave energy converter of claim 18, further comprising:
- an energy storage device, wherein the energy storage device is configured to be coupled to the at least one power take off.

24. The wave energy converter of claim 18, wherein the at least one power take off includes a first power take off and a second power take off, wherein the first body is operatively coupled to the first power take off through the first float arm and the second body is operatively coupled to the second power take off through the second float arm.

25. The wave energy converter of claim 24, wherein the first and second power take offs each have a rotor assembly and a stator assembly, and wherein the rotor assemblies of the first power take off and the second power take off rotate about the longitudinal axis.

26. A wave energy converter comprising:
- a central body including a nacelle, the nacelle having a first side, a second side, and a longitudinal axis, the nacelle housing at least one power take off;
- a first float and a first float arm coupled to the nacelle on the first side;
- a second float and a second float arm coupled to the nacelle on the second side;
- wherein the first float is rotatably coupled to the nacelle, the first float and the first float arm forming a first body configured to rotate about the longitudinal axis, wherein the first body is operatively coupled to the at least one power take off such that relative motion between the first body and the central body generates energy in the at least one power take off;
- wherein the central body further comprises:
  - a yoke extending downwardly from the nacelle;
  - a plurality of lines attached to the base of the yoke and extending downwardly, each of the plurality of lines have a lower terminus; and
  - a heave plate attached to the lower terminus of each of the plurality of lines, wherein the heave plate and lines attached to the lower portion of the yoke tend to reduce rotation of the nacelle;
- at least one line extending downwardly from the nacelle to the heave plate, wherein the at least one line includes at least one of a mooring line and an electro-opto-mechanical (EOM) cable; and
- wherein the wave energy converter is in combination with a base unit, the base unit comprising:
  - an anchoring element which is configured to position the base unit on an ocean floor;
  - an energy storage device associated with the anchoring element, wherein the energy storage device is configured to be coupled to the EOM cable;

a payload interface unit associated with the anchoring element, wherein the payload interface unit is configured for distribution of power, wired signals and/or wireless signals; and wherein the combination of the wave energy converter and the base unit form an autonomous offshore power system (AOPS) which can provide power generation, energy storage and real-time data communication.

* * * * *